United States Patent [19]

Hughes

[11] 4,228,273
[45] Oct. 14, 1980

[54] PROCESS FOR THE REMOVAL OF VINYL CHLORIDE FROM AQUEOUS DISPERSIONS OF VINYL CHLORIDE RESINS

[75] Inventor: William G. Hughes, Plainfield, N.J.

[73] Assignee: Tenneco Chemicals, Inc., Saddle Brook, N.J.

[21] Appl. No.: 939,769

[22] Filed: Sep. 5, 1978

[51] Int. Cl.³ .............................. C08F 6/24; C08F 6/16
[52] U.S. Cl. .................................... 528/491; 159/16 S; 260/29.6 PT; 528/500; 528/501; 526/344.2
[58] Field of Search ................. 260/29.6 PT; 528/500, 528/491, 501

[56] References Cited

U.S. PATENT DOCUMENTS

| | | | |
|---|---|---|---|
| 3,926,927 | 12/1975 | Stookey | 159/48 R |
| 4,015,064 | 3/1977 | Feldman | 528/491 |
| 4,031,056 | 6/1977 | Patel | 260/29.6 PT |
| 4,062,662 | 12/1977 | Kuxdorf | 55/206 |

OTHER PUBLICATIONS

Hoechst A. G. (Derwent Abst.) DT2521780, (Nov. 18, 1976).
Shinetsu Chem. Ind. KK (Derwent Abst.) BE853176, (Aug. 1, 1977).

Primary Examiner—C. A. Henderson
Attorney, Agent, or Firm—Evelyn Berlow

[57] ABSTRACT

Vinyl chloride is removed from an aqueous dispersion that contains 5%–50% by weight of a vinyl chloride resin and 1000–15,000 ppm of vinyl chloride by a process in which the aqueous dispersion is contacted first with steam and vinyl acetate to remove at least 90% of the vinyl chloride from it and then, after a short conditioning period, with steam to reduce its monomer content to less than 10 ppm.

5 Claims, 1 Drawing Figure

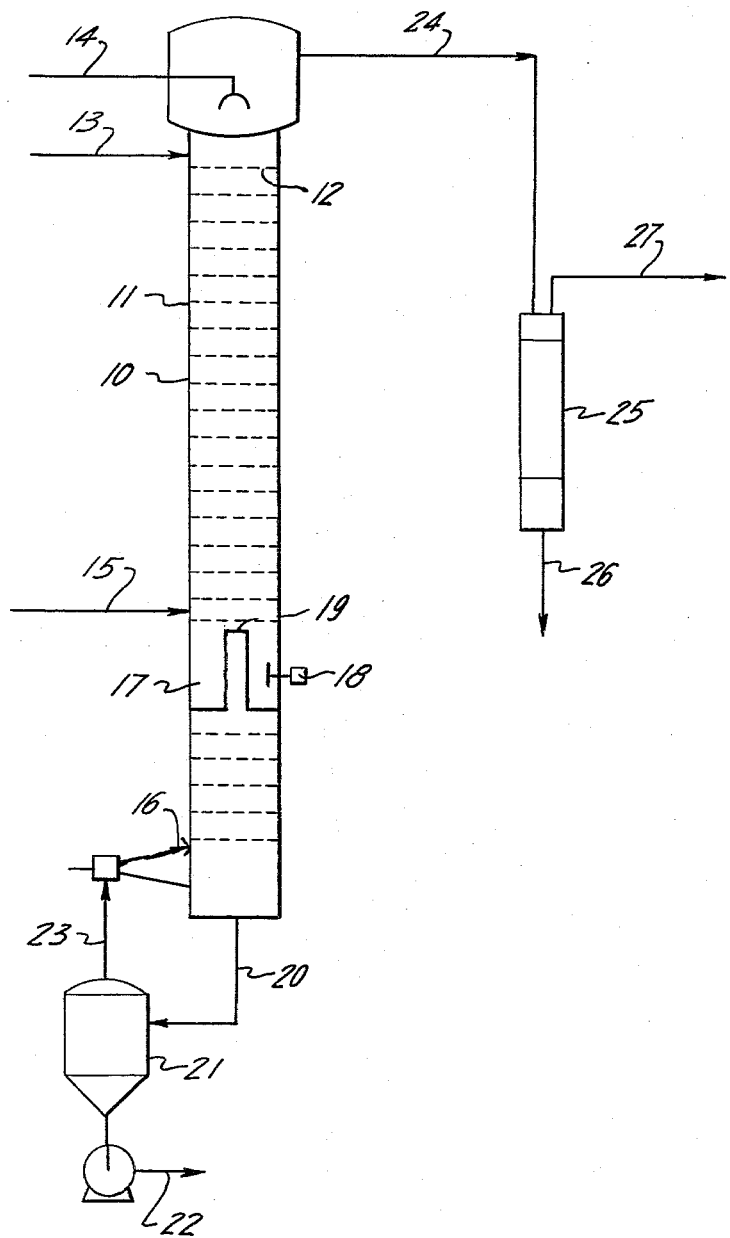

PROCESS FOR THE REMOVAL OF VINYL CHLORIDE FROM AQUEOUS DISPERSIONS OF VINYL CHLORIDE RESINS

This invention relates to a process for the purification of vinyl chloride resins. More particularly, it relates to a process for the removal of vinyl chloride from aqueous dispersions of vinyl chloride resins.

BACKGROUND OF THE INVENTION

When vinyl chloride or a mixture of vinyl chloride and a copolymerizable monomer, such as vinyl acetate, is polymerized in an aqueous medium, there is obtained an aqueous dispersion that contains from 5% to 50% by weight of a vinyl chloride resin and up to 5% by weight of vinyl chloride. Most of the unreacted vinyl chloride is usually removed by heating the aqueous dispersion under subatmospheric pressure to 65° C. As it is ordinarily practiced, this stripping procedure reduces the monomer content to about 1000 ppm to 15,000 ppm. Further processing yields dried products that contain 500 ppm or more vinyl chloride.

In view of the recently developed safety standards that require that the amount of vinyl chloride in vinyl chloride resins and in the atmosphere be maintained at very low levels, it is necessary that the monomer content of the aqueous dispersions be sufficiently reduced that these requirements can be met.

A number of procedures for the removal of vinyl chloride from aqueous dispersions of vinyl chloride resins have been reported, but none has proven to be entirely satisfactory. Procedures that involve heating the dispersions to temperatures above 65° C. for prolonged periods or subjecting them to conditions of high shear are effective in reducing the vinyl chloride content to low levels, but they usually have an adverse effect on the stability and filterability of the dispersions and on the color and other physical properties of the products. Among the reported procedures that involve the heating of aqueous dispersions of vinyl chloride resins to remove residual monomer from them are those disclosed in U.S. Pat. Nos. 2,820,028, 3,975,230, 4,017,445, 4,020,032, and 4,086,414 in which the aqueous dispersions are contacted with steam at temperatures above 80° C. to remove vinyl chloride from them and that disclosed in U.S. Pat. No. 4,086,412 in which a polyvinyl chloride-containing slurry is treated with hot water to reduce its monomer content. Procedures in which the aqueous dispersions are contacted with organic compounds either do not reduce the monomer content to the desired very low levels or they do so too slowly to be practiced commercially. Among the organic compounds that have been used in these processes are aliphatic hydrocarbons such as gasoline (U.S. Pat. No. 3,052,663), alcohols and/or epoxy compounds (U.S. Pat. No. 3,847,853), dioctyl phthalate and other plasticizers (U.S. Pat. No. 4,001,482), and vinyl acetate, methylene chloride, and di-tert.butyl-p-cresol (U.S. Pat. No. 4,015,064).

SUMMARY OF THE INVENTION

It has now been found that vinyl chloride can be removed rapidly and efficiently from an aqueous dispersion of a vinyl chloride resin without adversely affecting the properties of the dispersion or of the resin by contacting the dispersion first with steam and vinyl acetate at a temperature not above 85° C., preferably not above 75° C., under subatmospheric pressure to remove at least 90% of the vinyl chloride from it and then, after a short conditioning period at a temperature not above 85° C. under subatmospheric pressure, contacting it with steam at a temperature not above 95° C. under subatmospheric pressure. The dispersions treated in this way contain less than 10 ppm of vinyl chloride and in many cases less than 1 ppm of vinyl chloride. The vinyl chloride resin that is recovered from dispersions treated in this way contains less than 1 ppm of vinyl chloride.

In the first step of this process, an aqueous dispersion that contains vinyl chloride resin particles having a high concentration of vinyl chloride that is relatively easy to remove is heated at a moderate temperature under subatmospheric pressure to remove most of the monomer from it. At the same time, the particles are contacted with vinyl acetate, which has been found to assist in the removal of residual vinyl chloride from vinyl chloride resins probably by softening the resin particles and/or by increasing the rate at which the monomer diffuses from the inside of the particles through softened outer layers.

The dispersion from which more than 90% of the monomer has been removed then undergoes a short holding period at a moderate temperature in the presence of vinyl acetate during which the resin particles are further conditioned for the removal of vinyl chloride from them.

Following the conditioning step, the dispersion is contacted with steam under subatmospheric pressure to separate vinyl chloride, vinyl acetate, and other volatile impurities from it. If desired, all or a portion of the dispersion treated in this way can be recycled to bring its monomer content to a still lower level.

In this way, the vinyl chloride content of an aqueous dispersion of a vinyl chloride resin can be reduced rapidly from 1000 ppm–15,000 ppm to less than 10 ppm and in many cases to less than 1 ppm without subjecting the resin to prolonged heating at elevated temperatures or to other treatment that will result in degradation of the resin.

The process of this invention can be carried out in any suitable equipment. For reasons of efficiency and economy, it is usually carried out in a vertical distillation column, preferably a dual flow sieve tray column or a shower-deck tray column having from 10 to 30 actual plates and having a holding tray, for example, a chimney tray, at a point about 40% to 75% of the distance from the top of the column to its bottom.

BRIEF DESCRIPTION OF THE DRAWING

The drawing is a schematic diagram of an apparatus suitable for use in carrying out the process of this invention and for producing an aqueous dispersion of a vinyl chloride resin having a low vinyl chloride content.

Referring now in detail to the drawing, there is shown a dual flow sieve tray column 10 having spaced trays 11 in which there are apertures 12 through which the material to be treated can flow. At a point about 40% to 75% of the distance from the top of the column to its bottom is a chimney tray 17 that is equipped with a mechanical agitator 18. Just above the chimney tray is an inlet 15 through which vinyl acetate is fed into the column. There is an inlet 16 for steam at the bottom of the column.

DESCRIPTION OF THE PREFERRED EMBODIMENT OF THE INVENTION

The aqueous dispersion of a vinyl chloride resin, which is at a temperature in the range of 50°–70° C., preferably 65°–70° C., is fed into the top of the column through inlet 13 at the rate of 10,000 kg to 20,000 kg per hour. If excessive foaming occurs, a defoamer may be fed into the top of the column through inlet 14. Liquid vinyl acetate is fed into the column through inlet 15 at the rate of 700 kg–2000 kg per hour, and steam is fed into the bottom of the column through inlet 16 at the rate of 1000 kg–3000 kg per hour.

The aqueous dispersion that enters the column 10 through line 13 flows downward through the column by passing through the apertures 12 in the trays 11. The steam that is fed into the bottom of the column flows upward through the apertures and through the dispersion on the trays. When the steam comes into contact with the vinyl acetate that is entering the column through inlet 15, the vinyl acetate volatilizes and a sizeable amount of the steam condenses. In this way, the temperature in the portion of the column that is above the vinyl acetate inlet is maintained in the range of 65°–85° C., and the pressure is maintained in the range of 200 torr to 600 torr. The upper portion of the column is preferably maintained at 65°–75° C. at 200 torr–400 torr.

The aqueous dispersion that has been contacted with steam and vinyl acetate and that contains from 0.1% to 1.0% by weight of vinyl acetate then flows down into a holding tray, which is preferably chimney tray 17, situated just below the vinyl acetate inlet in the column. In the chimney tray, the dispersion is conditioned by agitating it and maintaining it at a temperature in the range of 75°–85° C. at a pressure in the range of 200 torr to 400 torr for 30 minutes or less. The dispersion leaves the chimney tray through outlet 19 and descends through the lower portion of the column where it is contacted with steam at a temperature in the range of 75°–85° C. at a pressure in the range of 300 torr to 600 torr.

The aqueous dispersion from which substantially all of the vinyl chloride, vinyl acetate, and other volatile impurities has been removed is then cooled by flashing it through line 20 into vacuum chamber 21. The cooled aqueous dispersion leaves the vacuum chamber 21 through outlet 22. The steam that leaves the vacuum chamber 21 through line 23 is compressed and recycled to the system through inlet 16.

A vapor stream that comprises steam, vinyl chloride, and vinyl acetate is removed from the top of the column through outlet 24 and passed to condenser 25 to separate an aqueous phase from a monomer phase. The aqueous phase is sent to a recovery system through line 26, and the monomer phase is sent to a recovery system through line 27.

The removal of vinyl chloride from aqueous dispersions by this process takes place so rapidly that the vinyl chloride resin in them is not subjected to lengthy heating at elevated temperatures. While the time required for each of the steps is dependent to a large extent upon the amount of vinyl chloride in the dispersion, the amounts of vinyl acetate and steam that are used, and the conditions that are maintained in the column, in most cases the treatment with steam and vinyl acetate is complete in 5 to 15 minutes, the conditioning step requires 2 to 30 minutes, and the final treatment with steam requires 10 to 25 minutes.

The aqueous dispersions that are treated in accordance with the process of this invention to remove vinyl chloride from them may be prepared by the well-known suspension or emulsion polymerization processes. In the suspension polymerization processes, the monomer component is suspended in water by a suspending agent and agitation. The polymerization is initiated with a free-radical-generating polymerization initiator, such as dilauroyl peroxide, dibenzoyl peroxide, diisopropyl peroxydicarbonate, di-2-ethylhexyl peroxydicarbonate, tertiary butyl peroxypivalate, azobisisobutyronitrile, azobis-2,4-dimethylvaleronitrile, and mixtures thereof. Suspending agents that may be used include methylcellulose, hydroxymethylcellulose, hydroxyethylcellulose, hydrolyzed polyvinyl acetate, gelatin, methyl vinyl ether-maleic anhydride copolymers, and the like. In emulsion polymerization processes, the polymerization initiator may be hydrogen peroxide, an organic peroxide, a persulfate, or a redox system. Surface-active agents, such as alkyl sulfates, alkane sulfonates, alkyl aryl sulfonates, and fatty acid soaps are used as emulsifiers in these processes. The reaction mixtures produced by these processes are usually heated under vacuum to about 60°–65° C. to remove most of the unreacted monomer from them. The resulting stripped dispersions generally contain 5% to 50% and preferably 15% to 40% by weight of vinyl chloride resin as particles that range in size from about 0.5 micron to 200 microns and from about 1000 ppm to 15,000 ppm of vinyl chloride. Following the removal of vinyl chloride from them by the process of this invention, the dispersions may be dewatered, for example, on a rotary drum filter, and then dried, or they may be spray dried. The vinyl chloride resins prepared in this way contain less than 1 ppm of vinyl chloride.

As used herein, the term "vinyl chloride resin" includes both the high molecular weight homopolymers of vinyl chloride and the high molecular weight copolymers formed by the copolymerization of vinyl chloride with an essentially water-insoluble ethylenically-unsaturated monomer that is copolymerizable therewith. Suitable comonomers include vinyl acetate, vinyl propionate, vinyl butyrate, vinyl stearate, vinyl benzoate, ethylene, propylene, ethyl acrylate, acrylic acid, acrylamide, acrylonitrile, methacrylonitrile, vinylidene chloride, dialkyl fumarates and maleates, vinyl ethers, and the like. When one or more of these comonomers are used, the monomer contains at least 70% and preferably 80% to 90% of vinyl chloride.

While the process of this invention can be used to remove vinyl chloride from aqueous dispersions that contain any of the aforementioned vinyl chloride resins, it is of particular value in the purification of those that contain vinyl chloride/vinyl acetate copolymers and other vinyl chloride copolymers that are particularly sensitive to high temperatures and to shear.

The following are typical examples that illustrate the manner in which the process of this invention can be used to remove vinyl chloride from aqueous dispersions of vinyl chloride resins.

EXAMPLE 1

An aqueous dispersion that contained 34.9% by weight of a vinyl chloride/vinyl acetate copolymer and 3490 ppm of vinyl chloride, which had been heated to 65° C., was fed at the rate of 17,400 kg./hr. onto the top plate of a twenty-five plate dual flow sieve tray column. At the same time, liquid vinyl acetate was fed onto the fifteenth tray of the column at the rate of 730 kg./hr. and steam at 80° C. at 300 torr was fed into the column at the bottom tray at the rate of 1400 kg./hr. The liquid vinyl acetate was vaporized by the steam, forming a vinyl acetate-rich vapor stream which came into contact with the aqueous dispersion descending through the upper portion of the column, which was maintained at a temperature in the range of 65°–73° C. and at a pressure in the range of 230–310 torr. The residence time of the dispersion in the upper portion of the column was 10 minutes.

The aqueous dispersion flowed into the chimney tray, which was situated in the column just below the vinyl acetate inlet, where it was agitated and maintained at 77° C./300–315 torr. After a hold period of 20 minutes, it flowed into the lower portion of the column, which was maintained at 76°–79° C./315–350 torr, where it was contacted with ascending steam for 20 minutes. The dispersion was then sent to a vacuum chamber where it was cooled to 65° C. in 30 minutes. The cooled dispersion contained 2.6 ppm of vinyl chloride.

The steam that was removed from the vacuum chamber was compressed and recycled.

The vapor stream leaving the top of the column contained 3% by weight of vinyl chloride, 47% by weight of vinyl acetate, and 50% by weight of water. It was passed through a condenser at 10°–15° C. to separate an aqueous phase that contained 47% by weight of vinyl acetate and 53% by weight of water from a gaseous phase that contained 59% by weight of vinyl chloride, 40% by weight of vinyl acetate, and 1% by weight of water. Vinyl chloride and vinyl acetate were recovered from the gaseous and aqueous phases and recycled.

EXAMPLE 2

An aqueous dispersion that contained 34.9% by weight of a vinyl chloride/vinyl acetate copolymer and 3490 ppm of vinyl chloride, which had been heated to 65° C., was fed at the rate of 17,800 kg./hr. onto the top plate of a twenty-five plate dual flow sieve tray column. At the same time, liquid vinyl acetate was fed onto the fifteenth tray of the column at the rate of 1680 kg./hr. and steam at 93° C. at 580 torr was fed into the column at the bottom tray at the rate of 1680 kg./hr. The vinyl acetate was vaporized by the steam, forming a vinyl acetate-rich vapor stream which came into contact with the aqueous dispersion descending through the upper portion of the column, which was maintained at a temperature in the range of 79°–83° C. at a pressure in the range of 230–550 torr. The residence time of the dispersion in the upper portion of the column was 10 minutes.

The aqueous dispersion flowed into the chimney tray, which was situated in the column just below the vinyl acetate inlet, where it was agitated and maintained at 80°–83° C./300–350 torr. After a hold period of 15 minutes, it passed into the lower portion of the column, which was maintained at 91°–93° C./350–580 torr, where it was contacted with ascending steam for 25 minutes. The dispersion was then sent to a vacuum chamber where it was cooled to 76° C. in 25 minutes. The cooled dispersion contained 2.5 ppm of vinyl chloride.

The steam that was removed from the vacuum chamber was compressed and recycled.

The vapor stream leaving the top of the column contained 2.2% by weight of vinyl chloride, 68.7% by weight of vinyl acetate, and 29.1% by weight of water. It was passed through a condenser at 10°–15° C. to separate an aqueous phase that contained 69.7% by weight of vinyl acetate and 30.3% by weight of water from a gaseous phase that contained 53.4% by weight of vinyl chloride, 44.6% by weight of vinyl acetate, and 2.0% by weight of water. Vinyl chloride and vinyl acetate were recovered from the gaseous and aqueous phases and recycled.

What is claimed is:

1. The process for the removal of vinyl chloride from an aqueous dispersion that contains 5%–50% by weight of a vinyl chloride resin and 1000 ppm–15,000 ppm of vinyl chloride that comprises the steps of
    (a) feeding the aqueous dispersion into a first treatment zone having a series of surfaces each having therein perforations through which the dispersion can flow downward onto the next surface in the series;
    (b) contacting the aqueous dispersion in the first treatment zone with a countercurrent stream of steam and vinyl acetate at a temperature in the range of 65°–85° C. at a pressure in the range of 200 torr to 600 torr to strip at least 90% of the vinyl chloride from the dispersion;
    (c) passing the dispersion downward into a second treatment zone where it is maintained at a temperature in the range of 75°–85° C. at a pressure in the range of 200 torr to 400 torr for up to 30 minutes;
    (d) passing the dispersion downward through a third treatment zone where it is contacted with a countercurrent flow of steam at a temperature in the range of 75°–95° C. at a pressure in the range of 300 torr to 600 torr; and
    (e) recovering an aqueous dispersion that contains less than 10 ppm of vinyl chloride.

2. The process of claim 1 wherein the vinyl chloride resin is a vinyl chloride/vinyl acetate copolymer.

3. The process of claim 1 wherein the aqueous dispersion that is fed into the first treatment zone in Step (a) is at a temperature in the range of 50° to 70° C.

4. The process of claim 1 wherein the dispersion in the first treatment zone is contacted with steam and vinyl acetate at a temperature in the range of 65°–75° C. at a pressure in the range of 200 torr to 400 torr.

5. The process of claim 1 wherein a portion of the dispersion that is recovered in Step (d) is recycled to Step (a).

* * * * *